United States Patent [19]

Jackson

[11] Patent Number: 4,700,955
[45] Date of Patent: Oct. 20, 1987

[54] CHUCKS

[75] Inventor: Joseph F. Jackson, Halifax, England

[73] Assignee: Pratt Burnerd International Limited, Halifax, England

[21] Appl. No.: 895,479

[22] Filed: Aug. 11, 1986

[30] Foreign Application Priority Data

Aug. 29, 1985 [GB] United Kingdom ............... 8521514

[51] Int. Cl.$^4$ .......................................... B23B 31/30
[52] U.S. Cl. ..................................... 279/4; 91/401
[58] Field of Search ............... 279/4, 2 R, 2 A, 111; 91/401, 472

[56] References Cited

U.S. PATENT DOCUMENTS

| | | | |
|---|---|---|---|
| 3,450,006 | 6/1969 | White | 91/401 |
| 3,924,514 | 12/1975 | Parsons et al. | 279/4 X |
| 4,221,160 | 9/1980 | Selden | 279/4 X |
| 4,326,449 | 4/1982 | Perraud | 91/401 |
| 4,337,687 | 7/1982 | Hoover | 91/401 |
| 4,443,021 | 4/1984 | Buchholtz et al. | 279/4 |

FOREIGN PATENT DOCUMENTS

| | | | |
|---|---|---|---|
| 928610 | 6/1973 | Canada | 91/401 |
| 2245129 | 3/1974 | Fed. Rep. of Germany | 91/401 |

Primary Examiner—Z. R. Bilinsky
Assistant Examiner—Glenn L. Webb
Attorney, Agent, or Firm—Murray and Whisenhunt

[57] ABSTRACT

A fluid-operated ram, for example comprising a cylinder 10 and piston 12, is provided for actuating a device such as a chuck having jaws 15. When the jaws are moved by the ram to grip a workpiece this constitutes a limiting position which impedes the flow of fluid thus causing a build-up of fluid pressure within the ram. This build-up can be detected to give an indication as to when a workpiece has been securely and safely gripped. To ensure that a false indication is not given if the ram reaches an end of its working stroke before the workpiece is securely gripped, means (22) are provided to relieve pressure within the ram when the ram reaches an end of its working stroke.

11 Claims, 6 Drawing Figures

CHUCKS

BACKGROUND TO THE INVENTION

The invention relates to chucks for use in holding tools or workpieces, and in particular to chucks which are controlled by a fluid-operated ram.

DESCRIPTION OF THE PRIOR ART

When such a chuck is used to grip a tool or workpiece, there is a risk that the ram may reach the end of its working stroke before jaws of the chuck have gripped the tool or workpiece sufficiently tightly. Frequently such chucks use a pressure sensing device to indicate when a tool or workpiece has been gripped sufficiently tightly, since there is then an increase of pressure in the operating fluid, but there will also be a build-up of pressure when the ram reaches the end of its working stroke, and so to avoid a dangerous condition in which a chuck is rotated while a tool or workpiece is inadequately gripped, means must be provided to differentiate between the two reasons for a build-up of pressure.

In one known form of chuck, proximity probes are provided on the cylinder of the ram to detect when the piston of the ram is at each end of its stroke.

With the chuck described in our co-pending U.S. patent application Ser. No. 525,729, now U.S. Pat. No. 4,616,838 problems arise from mounting proximity probes on the cylinder, since the cylinder is effectively integral with the chuck and rotates with it, making it difficult or impossible to make electrical connections to the probes.

SUMMARY OF THE INVENTION

Accordingly we have devised an alternative non-electrical solution to the problem. Although the solution has been devised specifically for use with the chuck described in U.S. Ser. No. 525,729, it is of general application.

The invention provides a fluid-operated ram for use in actuating a device such as a chuck, the device having at least one limiting position which will impede the flow of fluid hence resulting in a build-up of fluid pressure within the ram, and means to relieve the pressure within the ram when the ram reaches at least one end of its working stroke.

Since the pressure is relieved when the ram reaches at least one end of its working stroke, so that there is a continued flow of fluid to the ram, there can only be a build-up of pressure when the device (e.g. a chuck) reaches its limiting position.

Preferably the ram incorporates a pressure relief valve which is actuated when the piston of the ram reaches the said one end of its stroke.

The pressure relief valve may act to put the two sides of the piston into communication with one another.

Where the ram is double-acting, there may also be a non-return valve to ensure that even if the pressure relief valve is open, the direction of movement of the piston can be reversed.

Where it is desired to detect when the ram reaches each end of its working stroke, there may be a pair of pressure relief valves.

Each pressure relief valve may act as a non-return valve when the other pressure relief valve is open.

Each pressure relief valve may comprise a valve member spring urged on to a valve seat and a plunger arranged to move the valve member off its valve seat when the piston reaches one end of its working stroke.

The ram may be associated with detection means arranged to detect when the said device reaches its limiting position.

The detection means may comprise a pressure switch arranged to detect a build-up of pressure within the ram.

Alternatively, the detection means may comprise means to detect that fluid flow to the ram has ceased.

Other objects and advantages of the invention will become apparent from the following description of an embodiment of the invention, given by way of example.

DESCRIPTION OF THE PREFERRED EMBODIMENTS

Figure 1:
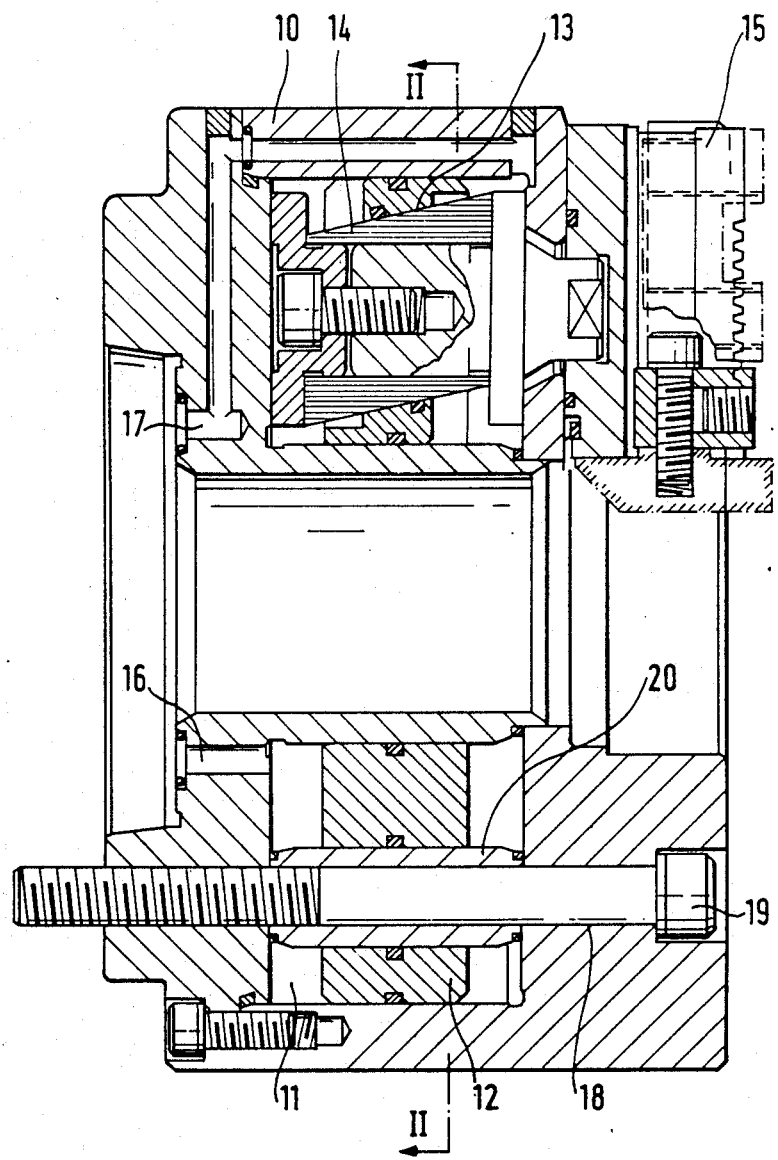
FIG. 1 is an axial cross-section through a chuck generally similar to that described in U.S. patent application Ser. No. 525,729 but incorporating an embodiment of fluid-operated ram according to the invention.
Figure 2:
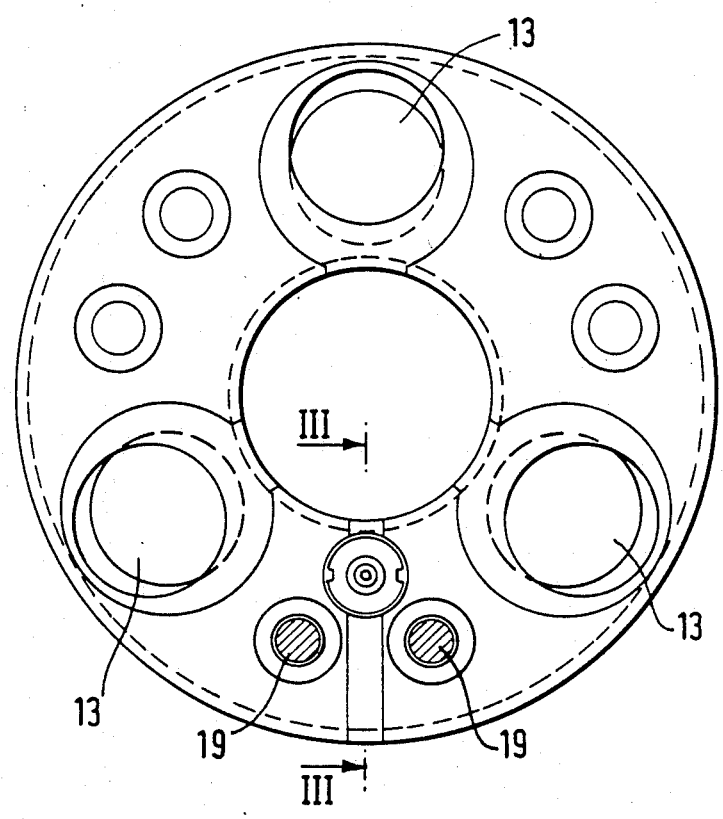
FIG. 2 is a partial cross-sectional view on line II—II of FIG. 1.

The chuck shown in FIG. 1 comprises a cylinder 10 defining an annular chamber 11 in which moves a piston 12. The piston has, uniformly spaced around it, three apertures 13 through which pass matingly shaped plugs 14. The apertures 13 and plugs 14 are so shaped that as the piston 12 moves back and forth, the plugs 13 move radially inwardly and outwardly, to operate the jaws 15 of the chuck. Fluid can be applied to one side of the piston 12 through a port 16 and to the other side through a port 17. Thus far the operation of the chuck is identical to that described in U.S. Ser. No. 525,729 and no more detailed description will be given here.

In order to bolt the chuck to the nose of a machine tool, passages 18 for bolts 19 are provided. To enable the bolts to pass through the piston and cylinder without interfering with the operation of the chuck, the piston 12 has passages therein, provided with sealed liners 20.

The significance of this embodiment of the invention lies in the way in which means are provided to detect when the piston has reached each end of its working stroke.

Figure 3:
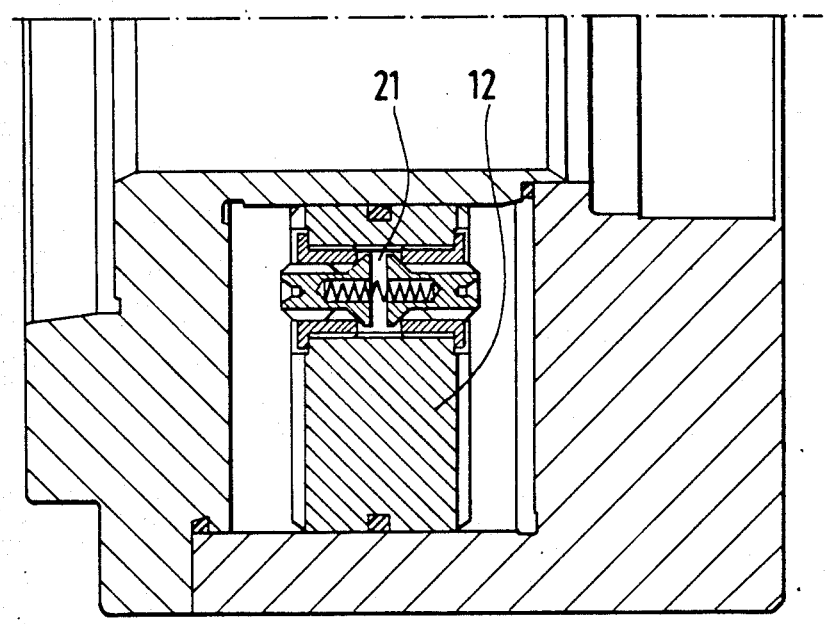
FIG. 3 is a cross-section on line III—III of FIG. 2.
Figure 5:
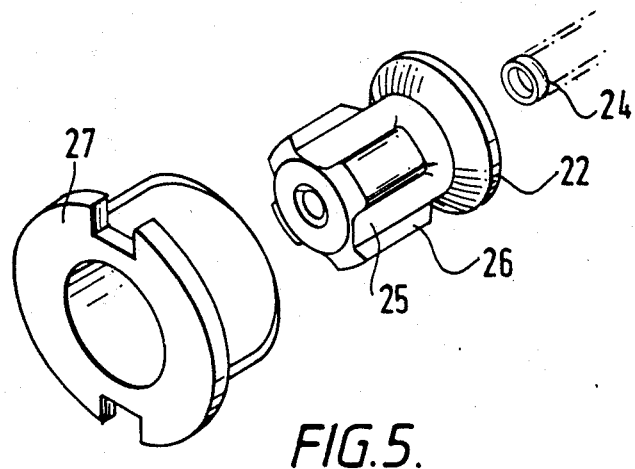
FIG. 5 is a perspective exploded view of some of the components shown in FIG. 4.
Figure 4:
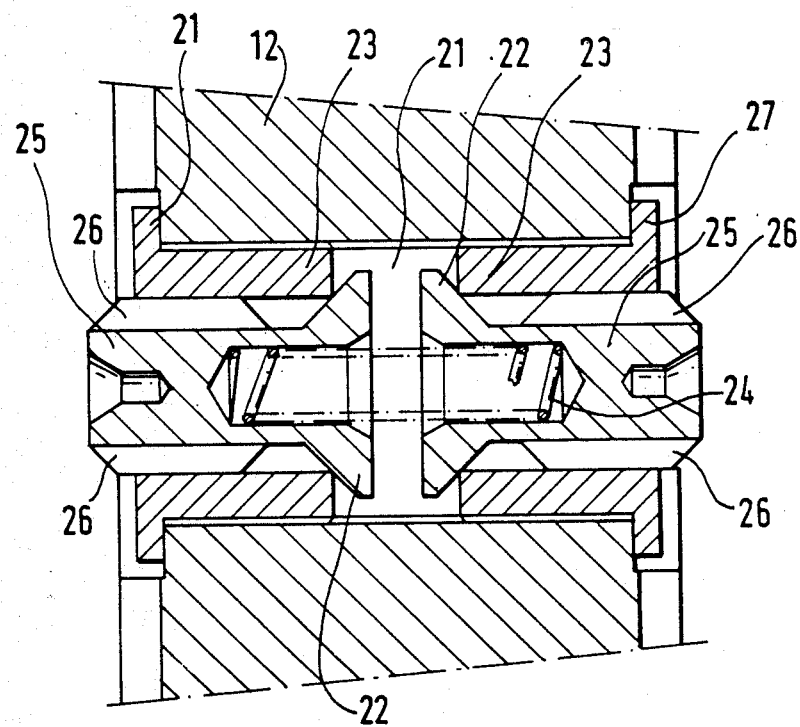
FIG. 4 is a view of part of FIG. 3 to an enlarged scale.

As shown in FIG. 3, and in more detail in FIG. 4, a further passage 21 is provided through the piston 12 and in this passage two non-return valves are provided back to back. Each non-return valve comprises a valve member 22 which engages a valve seat 23. The valve members are urged on to the valve seats by a compression spring 24 acting between the two valve members. Each valve member has an integral plunger 25 which projects to a point which is proud of the surface of the piston 12. Each plunger 25 is provided with flutes 20 to guide the movement of the valve member whilst permitting fluid flow past the plunger 25 when the valve member is moved off its associated seat.

Each seat 23 is provided by the end of a collar 27 which is screwed into a threaded portion of the aperture 21.

If the position of the jaws 15 in the chuck are adjusted correctly, and the chuck is only used to grip workpieces of a stipulated size, the jaws will always come into firm engagement with a tool or workpiece before the piston 12 reaches the end of its working stroke, and so there will be a build-up of pressure within the chuck and flow of fluid to the cylinder will cease, apart from relatively small leakage flow.

If however the jaws 15 should be incorrectly set, or the chuck be used to grip a tool or workpiece of inappropriate size, such that the piston 12 approaches either end of its working stroke, one of the plungers 26 will abut against one end wall of the cylinder and the associated valve member 22 will be lifted off its valve seat 23. The oppositely acting valve member 22 will act as a non-return valve and pressurised fluid will be able to flow through the piston from one side to the other. Thus fluid will continue to flow to the cylinder and there will be no build-up of pressure. This continuous flow, or lack of build-up of pressure, can be detected as described below and used to indicate a fault condition.

Because the oppositely acting valve member 22 acts as a non-return valve, the piston can still be moved away from the end of its stroke when desired by reversing the flow of fluid to the cylinder. The fluid will flow past the open valve member 22 but as it cannot flow in the reverse direction past the oppositely acting non-return valve, the piston will start to move again, and the open valve member 22 will in due course return to its seat 23.

The above sequence of events will take place regardless of the direction in which the piston is moving, since the two valves are mirror images of one another. If the piston moves to the right as viewed in the Figures and reaches the end of its working stroke, the right hand valve member 22 will be lifted off its seat and the left hand valve member 22 will operate as a non-return valve. If however the piston is moving to the left as viewed in the Figure and reaches the end of its working stroke, the left hand valve member 22 will be lifted off its seat 23 and the right hand valve member will operate as a non-return valve.

Because the valve members 22 relieve the pressure within the cylinder when the piston reaches the end of its working stroke, the only condition which will bring about a build-up of pressure within the cylinder is when the chuck jaws 15 securely grip a tool or workpiece. It would clearly be possible to provide an indication of this, for use in chuck control purposes, by fitting a pressure actuated switch in the supply line to the piston and cylinder. However it is common practice to provide pressure reducing valves in the supply line so that the supply pressure can be adjusted to cope with, for example, a delicate thin walled workpiece. This would mean that each time the supply pressure was adjusted, the level of operation of the pressure actuated switch would also have to be adjusted, which would be inconvenient. Accordingly, in this embodiment, means are provided to detect whether or not fluid is flowing to the piston and cylinder. Clearly, when the jaw securely grips a workpiece, flow to the piston and cylinder substantially ceases. If however the piston reaches the end of its working stroke, flow to the piston and cylinder continues, because flow can take place through the piston itself.

Figure 6:
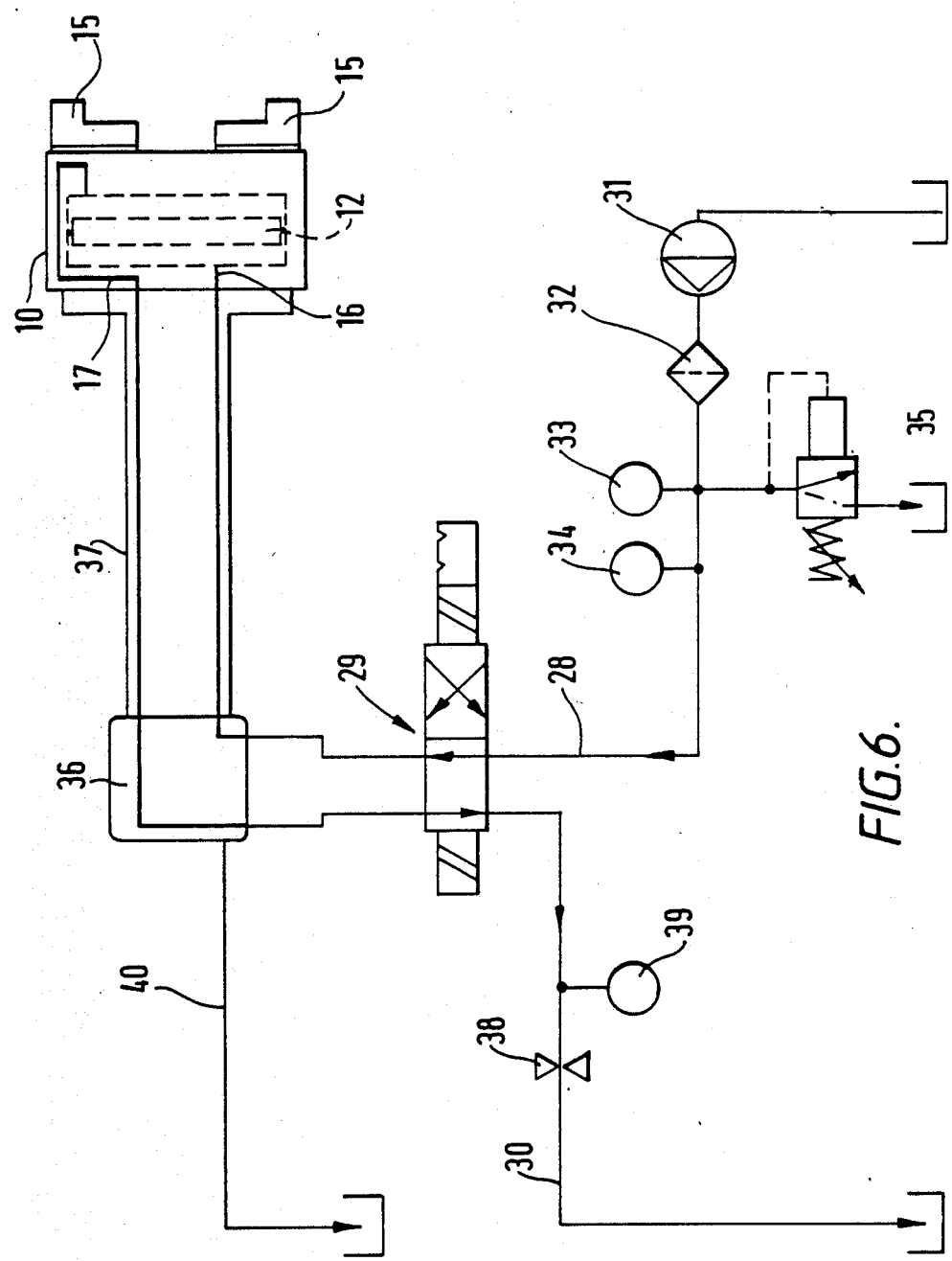
FIG. 6 is a schematic pressure circuit diagram showing the connections to the chuck incorporating the embodiment of the invention.

FIG. 6 illustrates diagrammatically the cylinder 10 and piston 12. There is a pressure supply line 28 extending to a changeover valve 20 and there is a fluid return line 30. The supply line 28 is fed from a pump 31, via a filter 32, pressure gauge 33, and pressure activated switch 34. The filter 32 filters the supply from the pump, the pressure gauge 33 gives a visual indication of the actual pressure in the supply line, and the pressure activated switch 34 provides a signal, for example for use with control circuitry, to indicate that the pump is providing an adequate pressure. There is also a pressure relief valve 35 to protect the supply line and its components in the event that the pressure should exceed a predetermined limit.

If it is desired to move the piston 12 to the right as viewed in FIG. 6, then the valve 29 is positioned as shown so that pressurised fluid is supplied to the port 16. This causes fluid to exhaust through port 17 to the return line 30. If it is desired to move the piston 12 to the left as viewed in FIG. 6, then the valve 29 is changed over, for example by means of a solenoid, to reverse the connections to the ports 16 and 17.

The connections are made through a conventional rotating distributor 36 to a machine tool spindle 37 which is connected to the chuck.

In order to detect the return flow, a sharp-edged orifice 38 is provided in the return line 30. A pressure actuated switch 39 is provided between the orifice 38 and the valve 29. When there is any significant flow down the return line 30, the orifice 38 causes a build-up of pressure which is detected by the pressure actuated switch 39.

When the chuck is activated to grip a tool or workpiece, then if the chuck is set correctly and operates correctly, there will be a flow of fluid to the chuck, and a corresponding return flow through the line 30, for a relatively short period of time, until the tool or workpiece is adequately gripped. Flow will then substantially cease, pressure in the return line will drop, and the pressure actuated switch 39 will indicate this accordingly. If however the piston reaches the end of its working stroke before the tool or workpiece is adequately gripped, flow will continue indefinitely. Thus the switch 39 can be coupled to a control circuit which will indicate a fault condition if flow continues for more than a predetermined length of time.

No seal can be perfect, and so there will be a certain amount of leakage flow down the return line 30. However the pressure produced by the flow of fluid through the sharp-edged orifice 38 is proportional to the square of the flow. Thus the pressure produced by the leakage flow will be very small indeed compared to the pressure produced by the flow indicating a fault condition.

There will also be a certain amount of leakage flow through paths other than the return line 30 but this leakage flow can be returned to supply via a line 40.

The invention is not restricted to the details of the foregoing embodiment. For example, although the embodiment utilises two mirror image valves arranged back to back, the two valves could be arranged at separate locations on the piston 12, provided that the valves are interconnected by a fluid flow passage.

Although the invention is shown applied to a chuck of the general type shown in U.K. Patent Application No. 8224769, the invention is clearly applicable to other chucks, and indeed clearly has useful application with any device where a fluid-operated ram is used to operate a device having at least one limiting position which will result in a build-up of fluid pressure within the ram.

It is not essential that the valves be arranged in the piston. Valves could be aranged in the cylinder such that when the piston reaches an end of its working stroke it contacts and operates one of the valves to put the two sides of the cylinder into communication with one another.

I claim:

1. A fluid-operated ram for use in actuating a device such as a chuck, said ram comprising:
   a piston moveable along a working stroke, said stroke having a first end and a second end, said device having at least one limiting position which generates a first condition in which flow of liquid is impeded and movement of said piston is halted at a position intermediate said first and second ends of said working stroke, thereby resulting in a build-up of fluid pressure within said ram;
   means for relieving pressure within the ram upon generation of a second condition in which movement of said piston is halted upon reaching at least one of said first and second ends and flow of fluid continues, thereby avoiding a build-up of fluid pressure within said ram; and
   means for sensing said first condition, thereby indicating said device has reached said at least one limiting position.

2. A fluid-operated ram for use in actuating a device such as a chuck, said ram comprising:
   a piston moveable along a working stroke, said stroke having a first end and a second end, said device having at least one limiting position which generates a first condition in which flow of fluid is impeded and movement of said piston is halted at a position intermediate said first and second ends of said working stroke, thereby resulting in a build-up of fluid pressure within said ram;
   means for relieving pressure within the ram upon generation of a second condition in which movement of said piston is halted upon reaching at least one of said first and second ends and flow of fluid continues, thereby avoiding a build-up of fluid pressure within said ram; and
   means for sensing said second condition, to thereby indicate a fault condition if fluid flow continues for more than a predetermined length of time.

3. A fluid-operated ram as claimed in claim 1 or 2, in which the ram incorporates a pressure relief valve which is actuated when said piston reaches said one of said first and second ends of said stroke.

4. A fluid-operated ram as claimed in claim 3, in which said pressure relief valve acts to put two sides of said piston into communication with one another.

5. A fluid-operated ram as claimed in claim 3, in which said ram is double-acting, and incorporates a non-return valve to ensure that even if the said pressure relief valve is open, the direction of movement of said piston can be reversed.

6. A fluid-operated ram as claimed in claim 3, in which there is a pair of pressure relief valves to detect when said piston reaches each end of its working stroke.

7. A fluid-operated ram as claimed in claim 6, in which each pressure relief valve acts as a non-return valve when the other pressure relief valve is open.

8. A fluid-operated ram as claimed in claim 6, in which each pressure relief valve comprises a valve member spring urged on to a valve seat and a plunger arranged to move the valve member off its valve seat when said piston reaches one end of its working stroke.

9. A fluid-operated ram as claimed in claim 1 or 2, associated with detection means for detecting when the said device reaches its limiting position.

10. A fluid-operated ram as claimed in claim 9, in which said detection means comprises a pressure switch for detecting; a build-up of pressure within the ram.

11. A fluid-operated ram as claimed in claim 9, in which said detection means comprises means for detecting that fluid flow to the ram has ceased.

* * * * *